Patented Aug. 10, 1954

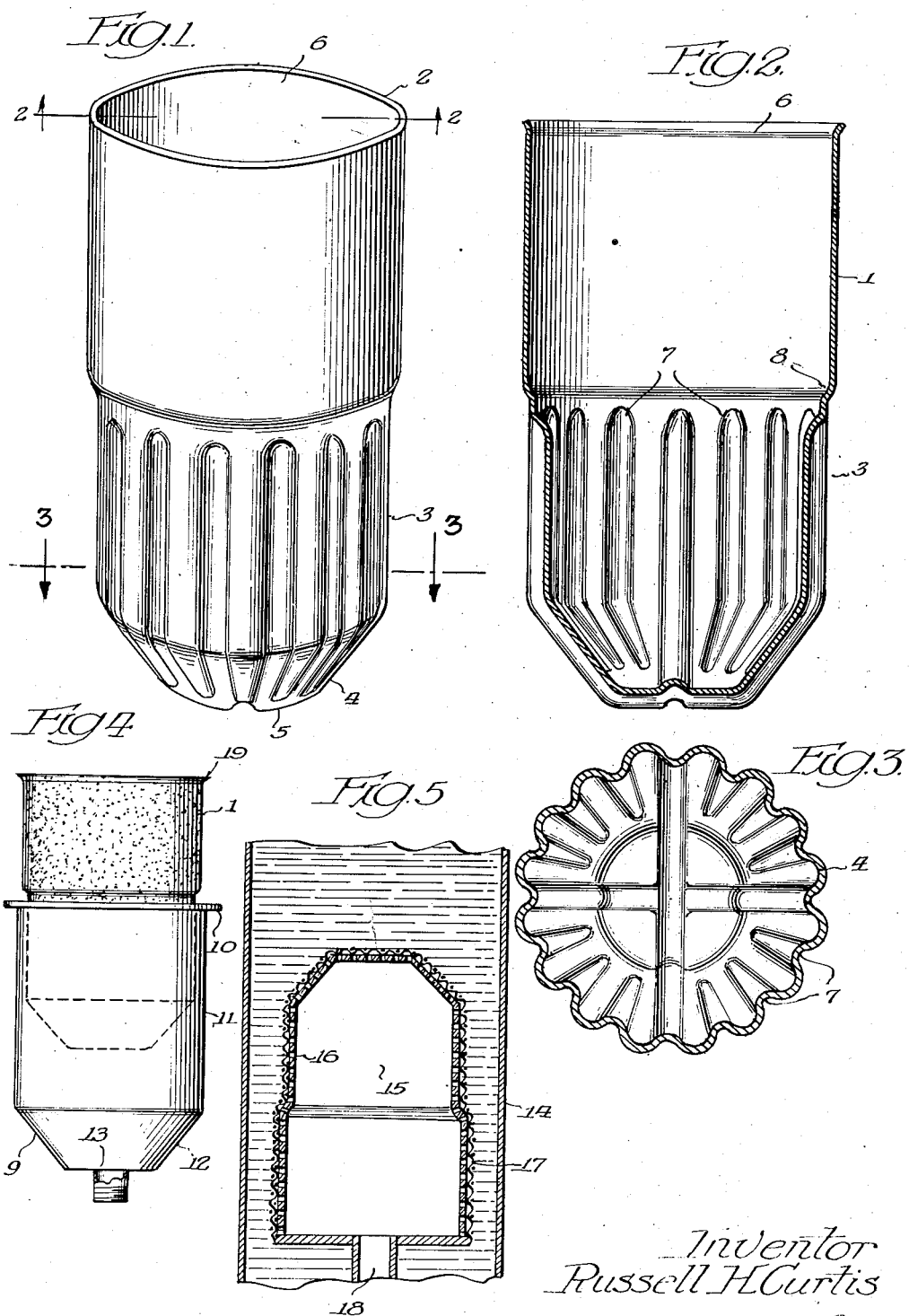

2,685,969

UNITED STATES PATENT OFFICE 2,685,969

FILTER ELEMENT

Russell H. Curtis, St. Charles, Ill., assignor to Hawley Products Company, St. Charles, Ill., a corporation of Delaware Application July 13, 1949, Serial No. 104,474

1 Claim. (Cl. 210—169)

This invention relates to filters made of fibrous materials, and particularly to replaceable filter elements for use in liquid systems.

It is an object of this invention to provide a filter element of one-piece molded fibrous construction for use in liquid systems.

Another object of the present invention is to provide a one-piece molded fibrous filter element which may be simply and inexpensively prepared, and which may be discarded after use.

Another object is to provide a filter element of light construction which will be self-supporting to resist a substantial filtration pressure.

A further object of this invention is to provide a strong molded fibrous filter element which will have an extensive surface area in contact with the liquid to be filtered.

A still further object is to provide a filter adapted to be removed from a casing with the filtered sludge contained entirely within the filter element so that it may be removed for disposal without contaminating the casing or the fluid circulating system.

The above objects and other objects and advantages of the invention will become apparent upon further examination of the description and drawings.

The present invention contemplates the preparation of a thin filter element which may be readily and inexpensively molded from conventional fibrous stocks in such form that it will provide a relatively large surface area to the contaminated liquid and at the same time will have sufficient structural strength to resist distortion from ordinary filtration pressures. The filter element may be designed to be used in any of the conventional filter casings which are presently being employed in the automotive and in the petroleum heating fields. A further use for which the filter element is particularly adapted is in motor fuel systems to remove sediment from fuels.

While the form of the filter element and the methods which may be employed in the preparation thereof are not limiting features of the present invention, a particular embodiment of the invention will be used in the following description and drawings for illustrative purposes only.

In the drawings, Fig. 1 is a perspective view of one embodiment of the invention showing the open end of the filter element at the top and the fluted supporting portion at the bottom;

Fig. 2 is a cross-sectional view along the line 2—2 of the filter element of Fig. 1;

Fig. 3 is a cross-sectional view of the filter element of Fig. 1 along the line 3—3 looking downwardly into the closed end of the filter element;

Fig. 4 is a side view of a conventional filter casing on a reduced scale showing the removal of a filter element from the casing; and Fig. 5 represents one method by which the filter element may be made. A carcass of fibrous material in the shape of the filter element may be deposited from the water dispersion upon the perforated screen.

Considering the drawings now in greater detail, in Fig. 1 one form of the molded fibrous filter element is shown in which the upper body 1 terminates in the flange 2 at the open end of the filter element. Integrally connected with the upper body 1 is the lower body 3 which narrows gradually at the base portion 4 terminating at the closed end of the filter element 5. The upper body 1 is of thin construction, being somewhat smoother on the inner surface 6.

The lower body 3 is slightly smaller in diameter than the upper body 1 to provide free space for the flow of filtered liquid between the filter element and the filter casing. The lower body is composed of a continuous series of flutes arranged to lend support to each adjacent flute. In this manner a large surface area is provided, and at the same time the structural strength of the fibrous filter element is increased. The flutes extend downwardly from the lower body 3 through the base portion 4 and terminate in the bottom portion 5. Hence, the base portion 4 and the bottom portion 5 likewise have a large surface area plus the structural strength of mutually supporting flutes.

Figs. 2 and 3 show the interior of the molded fibrous filter element showing the flutes 7 and the step-down portion 8 between the upper body 1 and the lower body 3. In Fig. 3 some of the flutes 7 are shown terminating at the lower end of the base portion 4. The flutes 7 are responsible for the structural strength of the element by virtue of their mutually supporting relation. Additionally, the flutes hasten the drainage from the filter element.

Fig. 4 graphically represents the removal of a molded fibrous filter element from one type of filter casing. The filter casing 9 is usually made of metal or molded plastic. The casing consists of a top flange 10, a body 11 and a base portion 12, having therein an opening 13 through which the filtered liquid may be exhausted from the casing. The sides of the upper body portion 1 may be vertical or tapered, but should preferably fit snugly against the inside of the casing 11 to form a seal therewith. In Fig. 4 the fibrous filter element is shown in a partially removed position with the upper body 1 exposed and the lower body 3 indicated by the dotted line. When the filter element has reached the end of its effective life, or for any other reason, it may be simply changed by removing the top of the casing and lifting the filter element as shown in Fig. 4. The entire element containing the filtered-out material may be removed in one piece and discarded without disturbing the entrapped sludge and without any possibility of contaminating the casing or the filter system with the sludge. A new element may then be inserted in the casing for continued operation.

Figure 4 also shows a modification of the filter illustrated in Figures 1, 2 and 3. The modification consists of an integrally molded flange 19, which can support the filter and also assists in forming a seal for the upper part of the filter.

A preferred apparatus for the preparation of the molded fibrous filter element is illustrated in Fig. 5. A container 14 is filled with a dispersion of fibers in water and the mold 15 is immersed therein. The mold 15 is composed of a heavy perforated body 16 which is roughly the shape of the finished article. Over the perforated body 16 is a screen 17 which is adapted to have the same shape as is desired in the finished article. The application of reduced pressure to the mold 15 through the inlet 18 causes a deposition of fibers from the dispersion onto the screen 17. The water passes through the screen and through the body 16 and is exhausted through the outlet 18. After a sufficient layer of fibers has been deposited upon the screen the mold is removed from the dispersion and the molded fibrous element may be transferred for drying or may be dried upon the form 15.

In use the molded fibrous filter element is inserted into a suitably designed filter casing in which the liquid to be filtered is introduced to the area within the filter element and passes through the filter element leaving any solid material entrapped within the filter element or between the fibers of the filter element. The cleaned liquid is then discharged from the filter casing into the liquid system where it is used. When the filter element becomes dirty or has reached the end of its useful life it may be easily removed and replaced with a clean element. Unlike the tube type of filter element in which the sludge impregnates the element throughout, and particularly at the outer edge, the present filter element retains the sludge within the cup portion of the element and makes disposal of the sludge much simpler. Furthermore, there is little possibility that the sludge may penetrate the filter element and be reintroduced into the liquid system.

The type of fibrous material employed in the preparation of the subject filter element may be varied widely depending upon the availability of materials and the characteristics desired in the finished product. For example, cellulosic fibers, wool fibers, spun glass fibers or any suitable combination of such fibers may be successfully used. Among cellulosic fibers are included wood pulps such as Kraft pulp and sulfite pulp, cotton linters, wheat and oat straw, bagasse, esparto, and the like. Synthetic fibers of many types are known which may be used alone or blended with other types of fibers. It is contemplated that one familiar with the pulp art will determine the type of fibrous material best suited to his purpose and employ the same in the practice of this invention. One satisfactory fibrous material is composed of 50% cotton linters and 50% rag stock.

Wet-strength resins are well known in the paper pulp art and include a variety of chemical compositions. The better known wet-strength resins include a melamine-formaldehyde type of resin and so-called one-stage phenolic resins of the phenol-formaldehyde type. The phenolic resins have the advantage of slightly improved water resistance and strength over the melamine resins. The wet-strength resins are to be distinguished from the coating resins in that the wet-strength resin will deposit upon the fibers in such manner as not to clog the area between fibers while the coating type resins tend to clog or seal the area between fibers. Thus, it will be seen that the wet-strength resin may be employed in a filter element, while the coating resin would be unsuited for this purpose.

In the present invention it is contemplated that any of the known methods of application of the wet-strength resin may be used. The earlier known methods involve a dipping process in which the molded fibrous article is immersed in the resin for a time sufficient to allow a coating of the resin to form on the fibers. A further development allows the introduction of the wet-strength resin into the beater where it is thoroughly mixed with the beaten fibers. Further treatment of the beaten dispersion of resin and fiber results in the deposition of a film of resin on the individual fibers. This resin impregnated fiber may be satisfactorily molded into the finished product with the elimination of the subsequent dipping step.

From the foregoing description of the invention and the drawings it will be seen that a filter element having novel advantages and characteristics has been provided by the preparation of a one-piece molded fibrous article having a large surface area and sufficient strength to withstand ordinary filtration pressures. The principal advantages of the present invention are in the preparation of an inexpensive filter element which may be readily changed and disposed of, and which is capable of cleaning a large volume of contaminated liquid.

The invention is hereby claimed as follows:

A filter comprising the combination of an impermeable generally cylindrical casing and a one-piece filter element of fibrous material consisting essentially of a generally cylindrical body having an open end and a closed end and permeably constructed of accreted fibers individually coated with a wet-strength resin, said body comprising in integral relation a smooth elongated upper portion adjacent the open end fitting snugly in said casing with its exterior in contact throughout with the interior of said casing, a lower elongated portion of smaller diameter than said upper portion, a base portion corresponding to the closed end of said body, and a plurality of flutes in the sides of said lower portion extending into said base portion.

References Cited in the file of this patent

UNITED STATES PATENTS

| Number | Name | Date |
|---|---|---|
| 669,129 | Stukes | Mar. 5, 1901 |
| 1,122,393 | House | Dec. 29, 1914 |
| 1,682,897 | Fesler | Sept. 4, 1928 |
| 1,941,982 | Gill | Jan. 2, 1934 |
| 2,093,167 | Gray | Sept. 14, 1937 |
| 2,147,792 | Knight | Feb. 21, 1939 |
| 2,298,674 | Burhans | Oct. 13, 1942 |
| 2,298,980 | Sloan et al. | Oct. 23, 1942 |
| 2,337,575 | Sloan et al. | Dec. 28, 1943 |
| 2,348,725 | Chaplin | May 16, 1944 |

OTHER REFERENCES

Collins: "Wet Strength Paper," Paper Industry and Paper World, June 1943, page 265.